United States Patent [19]

Harwood

[11] 3,996,608
[45] Dec. 7, 1976

[54] HUE CORRECTION APPARATUS HAVING A RESTRICTED RANGE

[75] Inventor: Leopold Albert Harwood, Somerville, N.J.

[73] Assignee: RCA Corporation, New York, N.Y.

[22] Filed: May 23, 1975

[21] Appl. No.: 580,681

[52] U.S. Cl. .............................................. 358/28
[51] Int. Cl.² ........................................ H04N 9/12
[58] Field of Search ................................... 358/28

[56] References Cited
UNITED STATES PATENTS

| | | | |
|---|---|---|---|
| 3,663,744 | 5/1972 | Harwood | 358/28 |
| 3,740,459 | 6/1973 | Okada | 358/28 |

Primary Examiner—Robert L. Griffin
Assistant Examiner—Mitchell Saffian
Attorney, Agent, or Firm—Eugene M. Whitacre; Kenneth R. Schaefer; Ronald H. Kurdyla

[57] ABSTRACT

Hue correction apparatus of the general type described in U.S. Pat. No. 3,663,744 is provided. Chrominance signals are monitored on a dynamic basis and the phase of a color subcarrier reference signal is automatically altered when the chrominance signals are in the vicinity of the flesh tone (+I) axis. The phase of the reference subcarrier is altered, making use of a wide bandwidth phase detector, by controllably adding a portion of an amplitude limited chrominance signal to the subcarrier so as to shift the subcarrier phase towards the phase of the chrominance signal. The range of angles and response of the apparatus is restricted by means of an offset bias control coupled to the chrominance signal adder circuits. Green and blue tones are relatively unaffected by the system operation. Good transient response of the correction apparatus is provided at sharp color transitions.

7 Claims, 4 Drawing Figures

HUE CORRECTION APPARATUS HAVING A RESTRICTED RANGE

This invention relates to color television signal processing apparatus and, in particular, to apparatus for automatically compensating for errors in signal components which can result in improper reproduction of flesh tones.

It is known that, in the process of reproducing images from received color television signals, the phase relationship between the transmitted color reference carrier and the color image-representative (chrominance) signals may vary due to a number of factors such as atmospheric conditions, switching from one signal source to another at the studio or switching from one channel to another at the receiver. The effect of such variations on the reproduced image is to cause errors in hue and is particularly discernible by the viewer where the image includes flesh tones (that is, tones represented by signals in the orange or "+I" axis region). A number of systems have been utilized to provide automatic flesh tone correction in color television receivers. Such systems generally distort the reproduction of at least some portion of the color spectrum and, in some instances, distort the amplitude of the color signals as well.

A system described in my U.S. Pat. No. 3,663,744, granted May 16, 1972, and assigned to the same assignee as the present invention, provides a desired correction of tones around the flesh axis without introducing amplitude or saturation distortion into the color (chrominance) signals. The principles described in my patent are employed in the circuit arrangement to be described subsequently.

In the design of flesh tone correction circuits, it is desirable to restrict the range of angles over which the correction is applied so as to more accurately reproduce colors such as green and blue, which are displaced by a significant angle from the flesh tone axis.

In accordance with the present invention, hue correction apparatus is provided in which colors represented by electrical signals having a phase coincident with the "+I" axis or by electrical signals having a component with a phase coincident with the "−I" axis are substantially unaffected. Furthermore, signals having a phase in the vicinity of the "+I" axis are effectively modified (or rotated) in phase by a small amount relative to a reference subcarrier. The effective phase displacement of such components is towards the "+I" axis. Signals representative of colors in the magenta and yellow-green portions of the spectrum are displaced in phase relative to the reference subcarrier to provide a greater shift in the reproduced color towards flesh tone. In each case, the amplitude of the phase displaced signals is undisturbed, thereby providing appropriate saturation information despite the change in hue. The range of phase angles over which the correction is applied is restricted substantially to signals having +I signal components. Primary colors, such as red, blue and green are reproduced with relatively small or no displacement.

Additional aspects of the present invention will be more readily understood from a consideration of the following description in connection with the accompanying drawings, in which.

Figure 1:
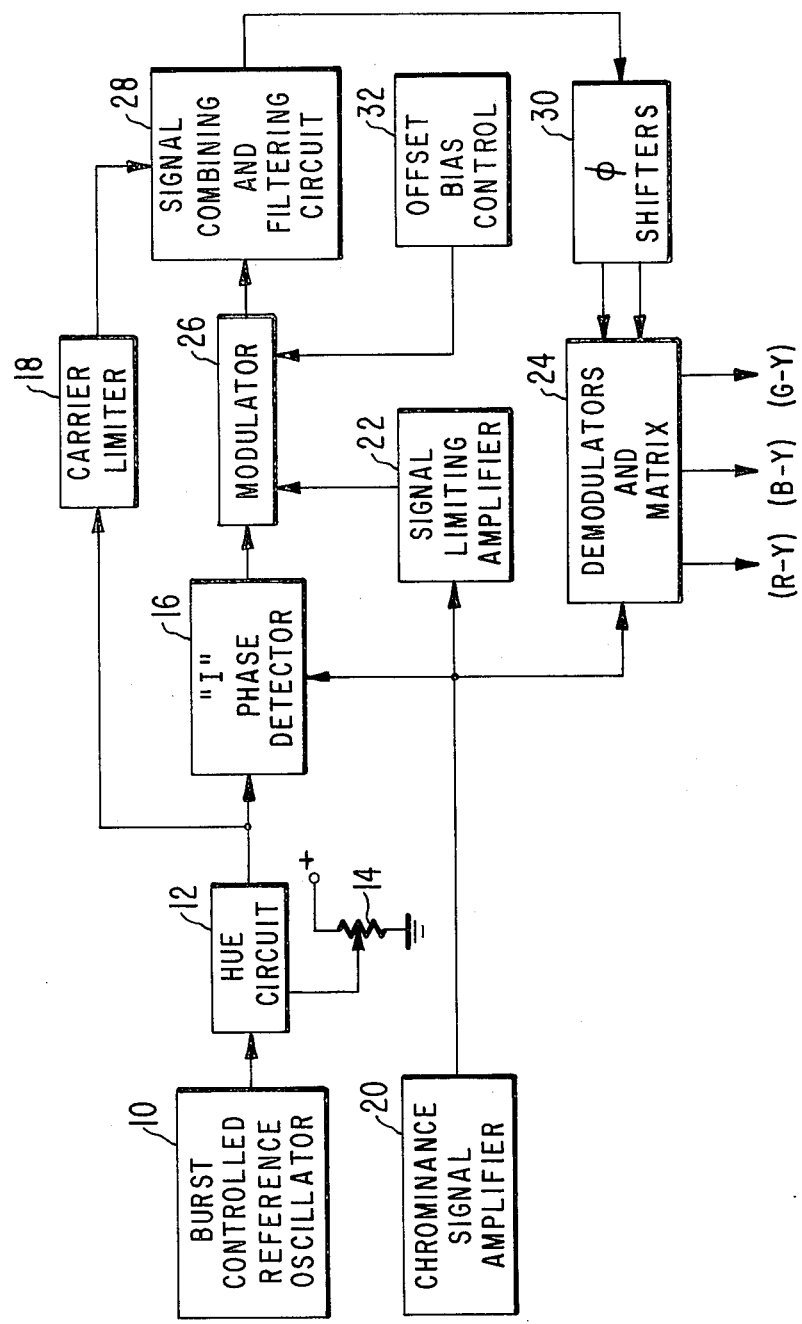
FIG. 1 is a block diagram of a chrominance signal processing circuit including an automatic flesh tone correction circuit in accordance with the present invention.

Referring to FIG. 1, a reference color oscillator 10, arranged to provide a continuous wave output at the color subcarrier frequency (e.g., 3.58 MHz), is locked in phase and frequency to the color burst signal customarily provided in a broadcast color television signal. The output of reference oscillator 10 is applied to a hue (tint) control circuit 12 which may be adjusted either electronically or manually, for example, by means of a potentiometer 14 to shift the phase of the oscillator signal and thereby effect a change in hue of the image to be reproduced as will appear below. The continous subcarrier wave output of hue control circuit 12 is supplied both to one input terminal of an I axis phase detector 16 and to a carrier limiter 18.

Chrominance signals are supplied from a chrominance signal amplifier 20 to a second input terminal of I axis phase detector 16, to a chrominance signal limiting amplifier 22 and to a demodulator and matrix circuit arrangement 24.

The limited chrominance signal output of limiting amplifier 22 is supplied to one input of a modulator circuit 26. The output of I axis phase detector 16, which is the product of the applied chrominance and reference carrier signals, is applied as a control signal to a second input of modulator 26 to vary the amplitude of the amplitude limited chrominance signal coupled to a signal combining and filtering circuit 28. The limited amplitude carrier signal supplied by carrier limiter 18 is vectorially added to the selected portion of the amplitude limited chrominance signal in combining and filtering circuit 28. A resultant phase corrected carrier signal is coupled via an appropriate phase shifter 30 to demodulator and matrix circuit 24. The demodulator portion of circuit 24 includes, for example, I and Q signal amplitude detectors which provide corresponding chroma signal outputs. These chroma signal outputs are then combined within demodulator and matrix circuit 24 to provide, for example, (R−Y), (B−Y) and (G−Y) color difference signal outputs.

As will be described in greater detail below, an offset bias control arrangement 32 is coupled to modulator 26 to select the range of chrominance signal phase angles over which modulator 26 operates.

In the operation of the system of FIG. 1, the phase of the color subcarrier regenerated by oscillator 10 may be adjusted by a viewer by means of hue control potentiometer 14. This phase adjusted subcarrier proceeds through carrier amplitude limiter 18 and the tuned filtering portion of circuit 28 (tuned, for example to 3.58 MHz) to the I signal demodulator portion of demodulator and matrix circuit 24. Phase shifter 30 provides, for example, a 90° phase shift to produce a carrier signal appropriate for application to the Q signal demodulator portion of demodulator and matrix circuit 24. Resultant demodulated I and Q chroma signals are filtered and matrixed to produce the desired color difference signal outputs in a known manner.

The illustrated flesh tone correction circuitry operates on the premise that the hue control potentiometer 14 is adjusted by the viewer at some instant of time of reasonably reproduce flesh tones. The I phase detector 16, which is arranged to detect characteristics of the chrominance signal along the same axis as that along which the I amplitude demodulator of demodulator and matrix circuit 24 operates, will then be alinged to detect the presence of flesh tone chrominance signals. In that case, I phase detector 16 multiplies the applied chrominance and subcarrier signals to provide a maximum output when the applied chrominance signal phase is coincident with the I axis and a decreasing output is provided as the signal departs from the I axis. Thus, when the supplied chrominance signals are in the vicinity of flesh tones, phase detector 16 controls the transfer characteristic of modulator 26 to pass more or less of the amplitude limited chrominance signal output of amplifier 22 according to the phase displacement between the I reference phase carrier and the chrominance signals. The resulting controlled portion of the amplitude limited chrominance signal combines with the limited reference subcarrier in signal combining and filtering circuit 28 to produce a new reference carrier, the phase of which is shifted towards that of the chrominance signal. When the chrominance signals are demodulated with respect to the new reference carrier in demodulator 28, the effect is phase compression of signals having I components.

In order to avoid distortion of green and blue tones, the response of modulator 26 is modified by means of offset bias control 32 so as to inhibit the operation of modulator 26 when −I components are present. This operation will be described in greater detail below with respect to the detailed circuit diagram of FIG. 2.

Figure 2:
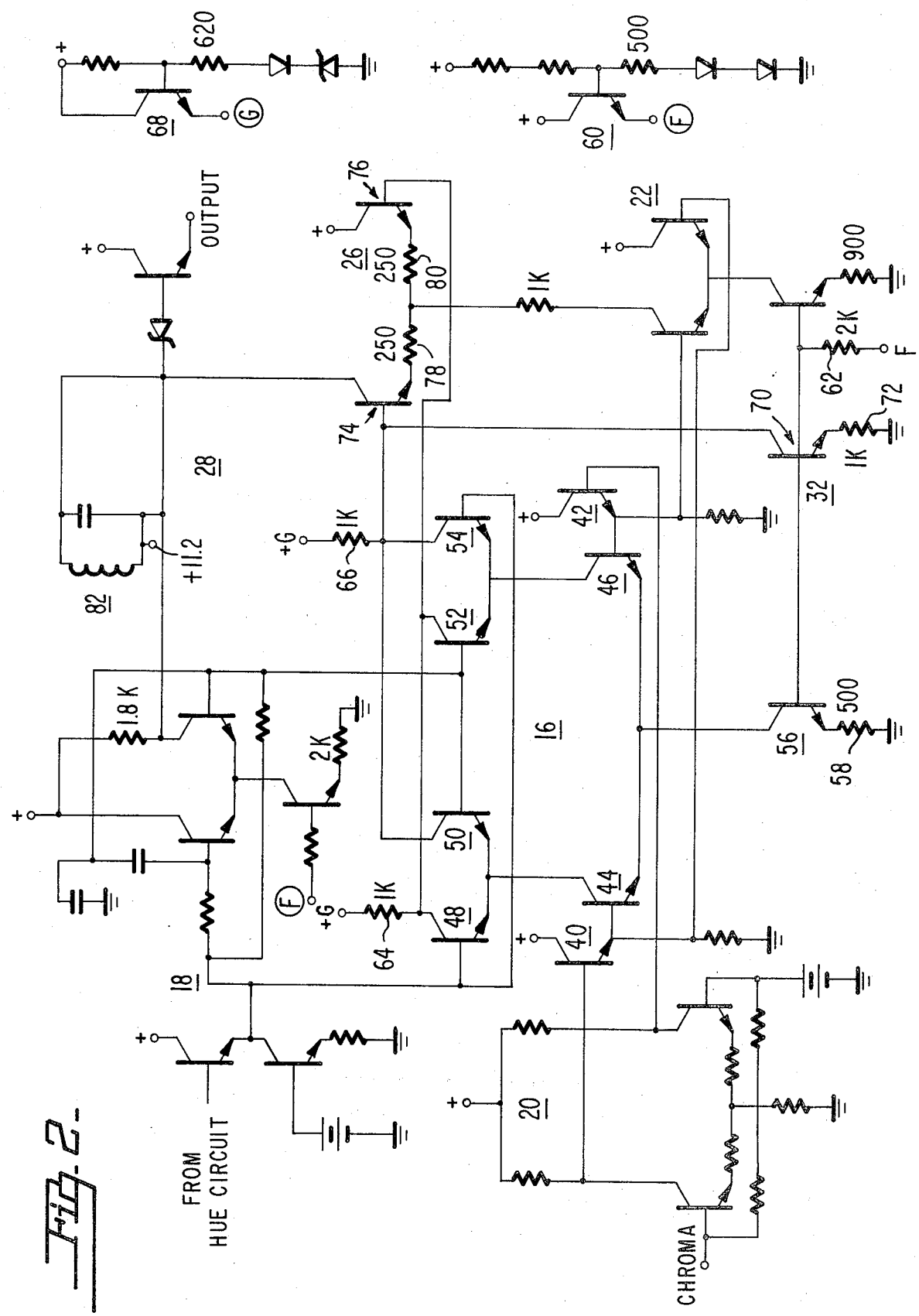
FIG. 2 is a detailed circuit schematic diagram of a portion of the apparatus of FIG. 1.

In FIG. 2, the various portions of the circuit which correspond to portions of the block diagram of FIG. 1 are labelled with corresponding reference numbers. Chrominance signal amplifier 20 (a differential amplifier) provides push-pull chrominance signals via emitter followers 40, 42 to phase detector 16, the latter comprising six transistors 44, 46, 48, 50, 52, 54 arranged in a known multiplier configuration. Operating current is supplied to the multiplier via a current source transistor 56, the emitter of which is returned to ground via a resistor 58. The operating current of transistor 56 is determined by a first bias supply 60, the output (F) of which is coupled via a resistor 62 to the base of transistor 56.

Wide bandwidth load circuits comprising load resistors 64 and 66 are coupled respectively between a second supply voltage (G) provided by a second bias supply 68 and the joined collector outputs of transistors 48, 52 in the one case and transistors 50, 54 in the other case.

Offset bias control 32 comprises a transistor 70 having an emitter electrode returned to ground via a resistor 72, a base electrode coupled to the first bias supply 60 via resistor 62 and a collector electrode coupled to the base of one transistor 74 of modulator 26. Modulator 26 further comprises a second transistor 76 coupled in differential fashion to transistor 74. Emitter degenerating resistors 78, 80 are associated with transistors 74 and 76. Limited chrominance signals are coupled from limiter 22 to the junction of resistors 78 and 80. The collector of transistor 74 is coupled to the signal combining circuit 28 which includes a resonant circuit 82 tuned to the color subcarrier frequency (e.g., 3.58 MHz). The bases of transistors 74 and 76 are coupled to the two output terminals of I phase detector 16 associated with load resistors 66 and 64, respectively.

Figure 3:
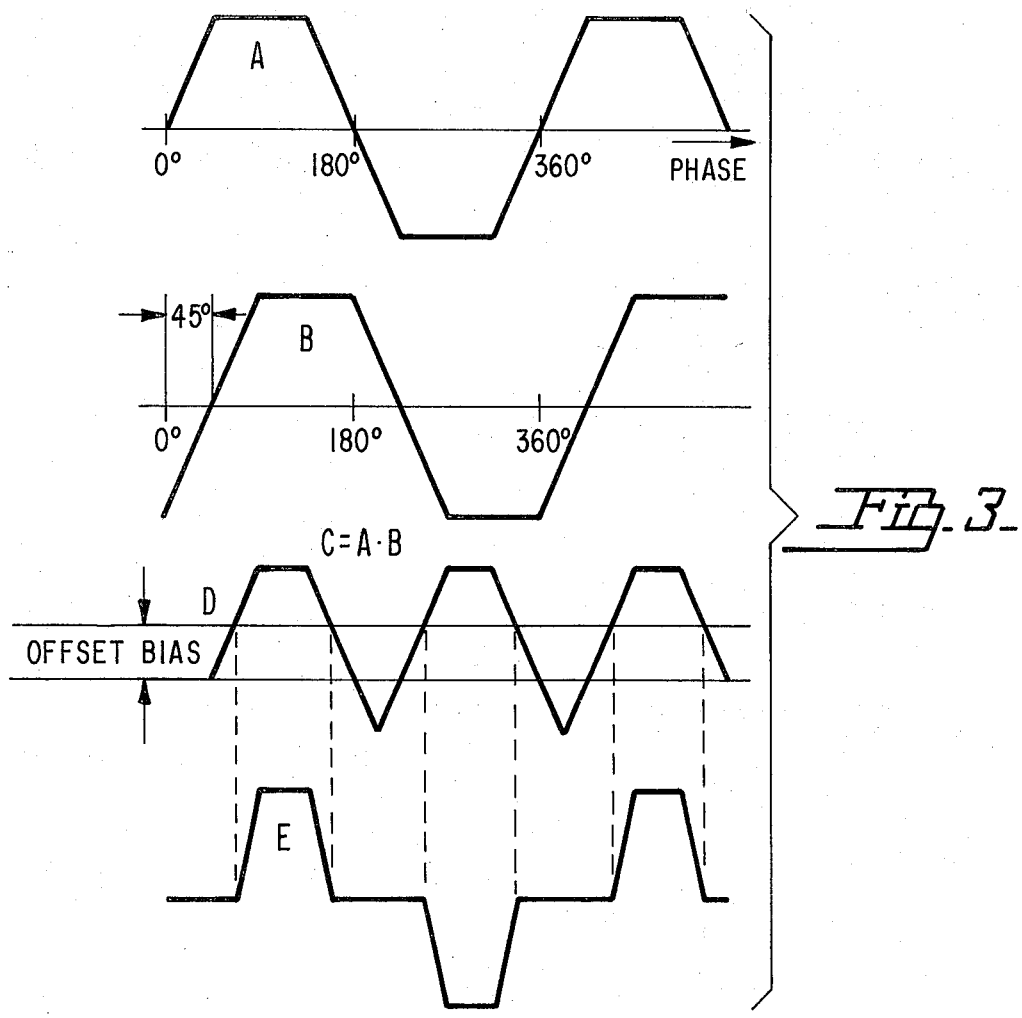
FIG. 3 is a series of waveform diagrams which are useful in explaining the operation of the circuit of FIG. 2.

The operation of the circuit of FIG. 2 will be explained referring to the waveform of FIG. 3. The push-pull amplitude modulated chrominance signals developed by amplifier 20 are coupled via follower transistor 40, 42 both to I phase detector 16 and to chrominance signal limiting amplifier 22. Amplifier 22 removes the signal amplitude variations from the signal and provides a substantially trapezoidal output waveform (see, for example, waveform B of FIG. 3) in which the phase information of the chrominance signal is preserved. The amplitude of this limited chrominance signal which is passed through modulator 26 to tuned circuit 82 is a function of the instantaneous potentials at the bases of transistors 74, 76. These potentials are determined in the first instance by the operation of I phase detector 16.

For purposes of explanation, it will be assumed that the output of chrominance signal amplifier 20 is a substantially sinusoidal waveform and that the reference subcarrier supplied from hue control circuit 12 is also a sinusoidal waveform. In the operation of phase detector 16, as is known, signal voltage swings of the order of 200 millivolts are sufficient to drive the transistors 44-54 into limiting, thereby converting the applied sinusoidal waveforms to substantially trapezoidal waveforms. A trapezoidal reference subcarrier waveform (A) and a trapezoidal chrominance signal waveform (B), the latter being displaced approximately 45° from the former, are therefore illustrated in FIG. 3. The multiplier operation of the wide bandwidth phase detector 16 will produce a waveform (C) at one output of multiplier 16 (e.g., at the base of transistor 74) which is asymmetrical with respect to a reference axis. It should be noted that, unlike most conventional phase detector circuits, the output of phase detector 16 is not filtered. Hence, the asymmetrical waveform is produced. This wide bandwidth operation is desirable in order to provide appropriate phase correction even when there are relatively rapid color transitions in the chrominance signal. The wide bandwidth operation of phase detector 16, however, has the undersired affect of extending the correction range towards the green and blue color regions. In order to avoid this result, the offset bias control circuit 32, which provides additional current through resistor 66, is arranged to shift the bias of transistor 74 relative to transistor 76 in a direction towards cutoff. The effect of this offset bias is illustrated in waveform C by the horizontal line labelled "D". Conduction of transistor 74 is thus shifted from the relatively wide angle represented by the portion of waveform C above the lower reference axis to a relatively smaller angle represented by the intersection of waveform C with the offset bias axis represented by D. The limited chrominance signal which passes through modulator 26 (transistor 74) is modified by the gating waveform C to produce an unfiltered limited chrominance signal represented by waveform E. Upon application to signal combining circuit 28, the waveform E will be combined with a limited subcarrier waveform similar to waveform A to produce a resultant reference carrier, the phase of which has been shifted towards the chrominance signal phase.

It should be noted that the waveform E itself is shifted away from the phase of the original chrominance signal (waveform B) and towards the phase of the reference subcarrier (waveform A).

Figure 4:
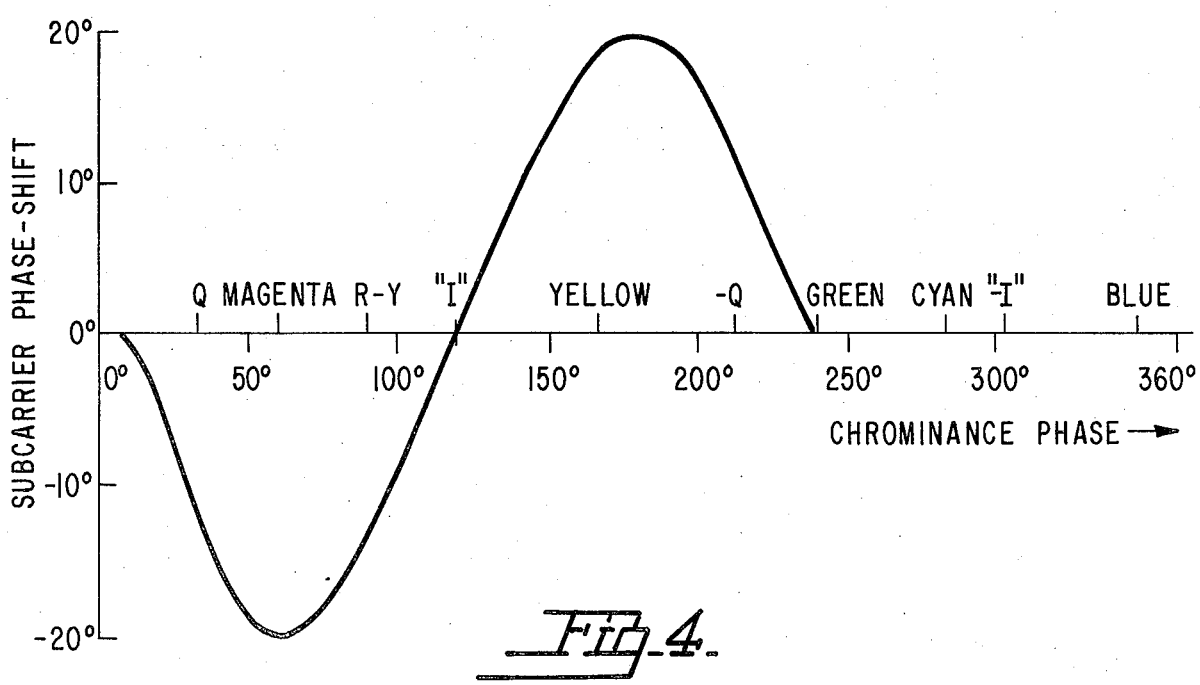
FIG. 4 illustrates a typical characteristic of subcarrier phase shift as a function of chrominance signal phase provided by the circuit of FIG. 2.

In a particular embodiment of the invention corresponding to that illustrated in FIG. 2, the reference subcarrier will be phase shifted according to the characteristic shown in FIG. 4. A maximum correction of 20° is therefore applied in the magenta and yellow-green regions. No correction is applied when the chrominance signals are along the flesh axis or in the green-blue (−I) region. It should be recognized that circuit modifications may be made to change this response without departing from the present invention.

The apparatus described above may be utilized in connection with numerous signal processing systems, one example of which is shown in Color Television Service Data 1974 No. C-5 (CTC-68) published by RCA Corporation, Indianapolis, Ind.

What is claimed is:

1. In a system for processing color television signals including chrominance signals having a phase representative of hue and an amplitude representative of saturation of colors present in a scene, said television signals further including a reference subcarrier signal having a nominal phase relative to said chrominance signals, hue correction apparatus comprising:

means having at least a first input responsive to said reference subcarrier signal and at least a second input responsive to said chrominance signals for providing a control signal with a wide bandwidth relative to said chrominance signals and representative of a phase relationship between said chrominance signals and chrominance signals represenative of flesh tones as determined by the nominal phase of said reference subcarrier;

signal modulating means responsive to said chrominance signals and to said control signal for passing a selected amplitude portion of said chrominance signals;

signal combining means responsive to said reference subcarrier signal and to said selected amplitude portion of said chrominance signals for providing a corrected reference subcarrier having a phase modified towards the phase of said chrominance signals according to said selected amplitude portion of said chrominance signals; and biasing means coupled to said signal modulating means for restricting output of said selected amplitude portion of said chrominance signals so as to restrict correction of said reference subcarrier phase to a phase region in the vicinity of the nominal flesh tone phase.

2. Hue correction apparatus according to claim 1 wherein:

said means for providing a control signal comprises a signal multiplier for providing an unfiltered control signal represented of a phase relationship of said chrominance signal to a reference phase corresponding to flesh tones.

3. Hue correction apparatus according to claim 2 and further comprising:

signal limiting means responsive to said chrominance signals for removing amplitude variations therefrom to provide an amplitude limited output signal; and means for coupling said amplitude limited output signal to said modulating means, said modulating means selecting, in response to said control signal, a portion of said amplitude limited output signal.

4. Hue correction apparatus according to claim 1 wherein:

said means for providing a control signal comprises a phase detector having a relatively wide bandwidth for detecting phase differences between said applied chrominance signals and a reference phase corresponding to flesh tones.

5. Hue correction apparatus according to claim 4 wherein:

said modulating means comprises at least a first transistor having an input electrode coupled to said phase detector; and said biasing means comprises a current source coupled to said input electrode for biasing said first transistor towards cutoff in the absence of output signals from said detector.

6. Hue correction apparatus according to claim 5 wherein:

said modulating means comprises a second transistor coupled in differential fashion to said first transistor; and said current source provides bias to said first transistor input electrode of a sense to render said first transistor less conductive than said second transistor in the absence of output signals from said phase detector.

7. Hue correction apparatus according to claim 6 wherein:

said biasing means provides bias to said first transistor sufficient to restrict outputs from said modulating means substantially to chrominance signals having +I phase components.

* * * * *